United States Patent

[11] 3,590,856

| [72] | Inventor | Salmon Gerhardus Antonie Fritz<br>Ficksburg, South Africa |
|---|---|---|
| [21] | Appl. No. | 24,062 |
| [22] | Filed | Mar. 31, 1970 |
| [45] | Patented | July 6, 1971 |
| [73] | Assignee | Neutralized Valves Proprietary Limited<br>Johannesburg, South Africa |
| [32] | Priority | Apr. 3, 1969 |
| [33] | | South Africa |
| [31] | | 69/2390 |

[54] SINGLE ACTUATOR FOR PLURAL VALVES
10 Claims, 8 Drawing Figs.

[52] U.S. Cl. .................................................. 137/411,
137/505.21, 137/629
[51] Int. Cl. ...................................................... F16k 11/10
[50] Field of Search ........................................... 137/411,
434, 435, 450, 505.21, 629

[56] References Cited
UNITED STATES PATENTS

| 2,381,553 | 8/1945 | Mott.............................. | 137/629 |
| 3,011,515 | 12/1961 | Kravagna .................... | 137/411 |

Primary Examiner—M. Cary Nelson
Assistant Examiner—David R. Matthews
Attorney—Karl W. Flocks ABSTRACT: A valve having internally an axially displaceable fluid passage part presenting on the intake end at least two ports seatable on separate closure elements of which one is fixed and the other movable to a limited extent for the port of the fixed closure element to open before the other port. The passage port is displaceable by manual, mechanical or automatic means. The valve is automatically controllable by changing fluid pressure at the outlet end and provides on said end of the passage a face on which said fluid pressure reacts for application of a closing force against spring biassing applied to the passage part, while at the intake end of the passage part equal faces are presented to neutralize the supply fluid pressure on the passage part.

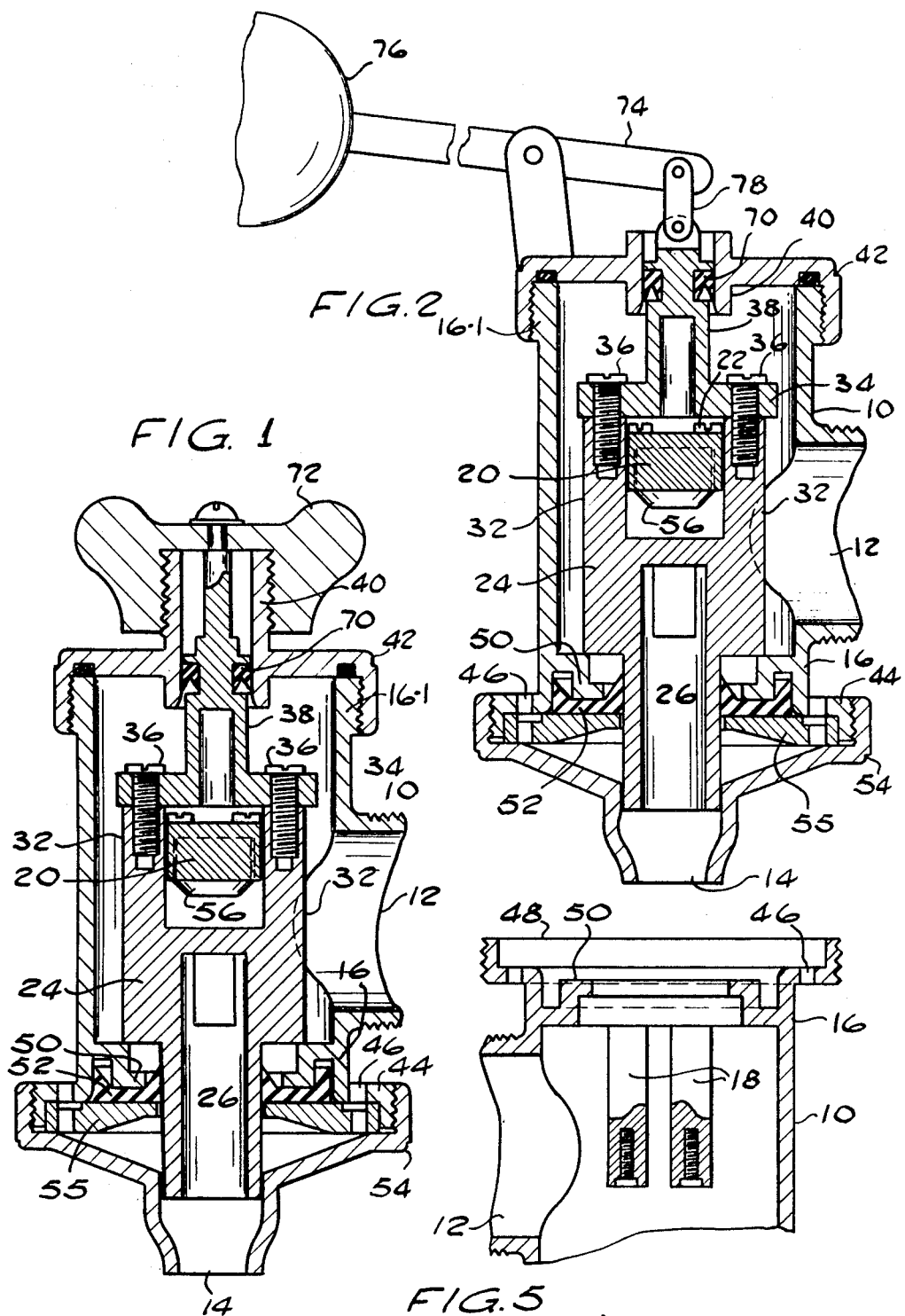

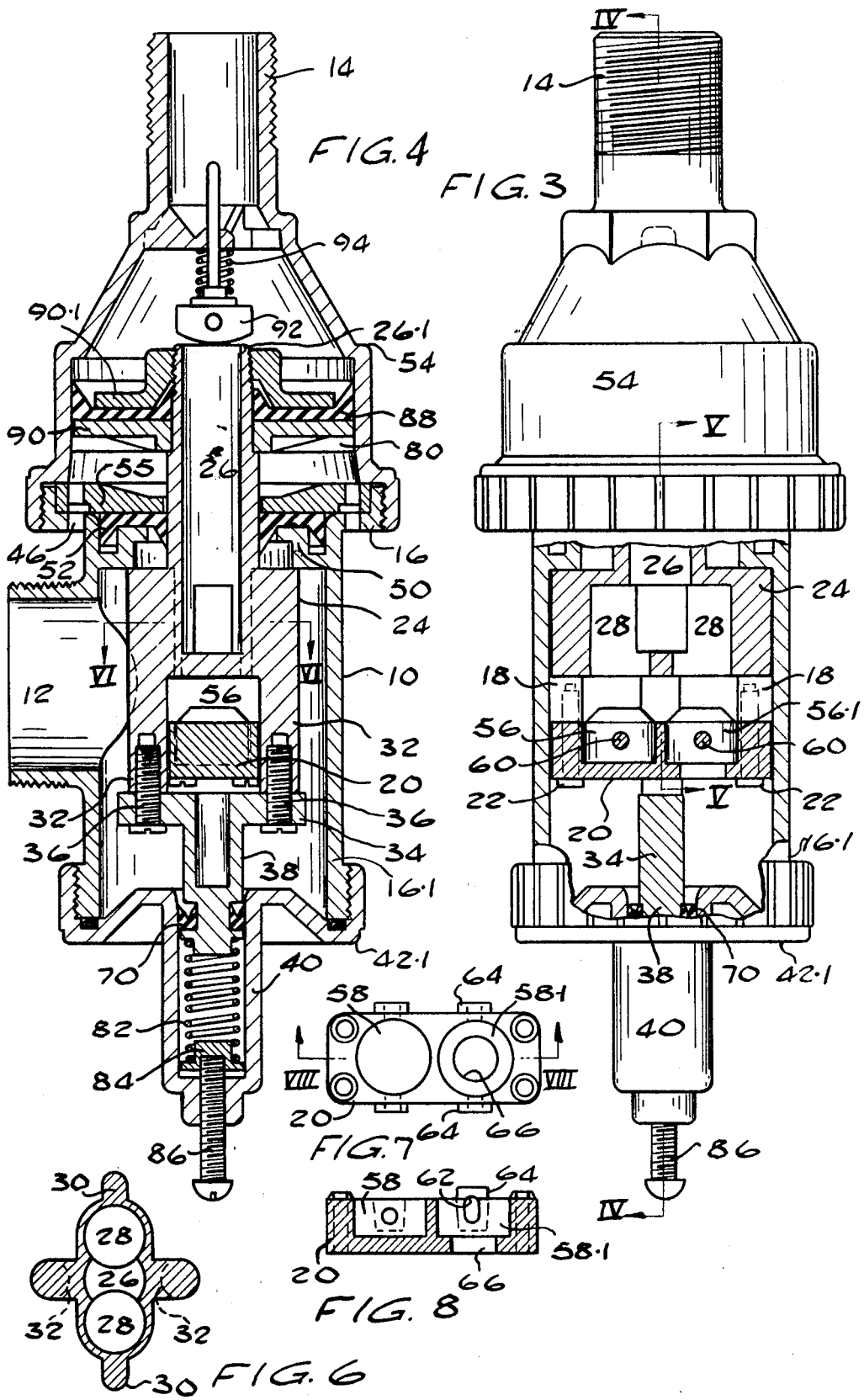

SINGLE ACTUATOR FOR PLURAL VALVES

FIELD OF INVENTION

This invention relates to improvements in valves, which may be manually, mechanically or automatically opened and closed.

SUMMARY OF THE INVENTION

According to the invention a valve is provided which includes a casing having an inlet and an outlet, a part movable within the casing, a fluid passage in the movable part and of which a closable end is divided to present at least two spaced ports, a closure element for each port, and a carrier for the closure elements and on which one closure element is fixed and the remaining element movable thereon to a limited extent, the arrangement being such that for opening of the valve by displacing the movable part away from the carrier, the fixed closure element opens before the movable element whereby an initial force required to cause opening of the valve is reduced.

The force for opening of the valve may be produced by manually operated means, a float-actuated device or differential pressures. The movable internal fluid passage part of the valve is constructed to provide equal opposed transverse faces to neutralize resultant internal fluid pressures reacting on such part so that the pressure within the inlet region of the valve embodiment does not affect the movement of the said movable part.

Adjustable valve opening biassing means may be incorporated in the valve. Such adjustable biassing means preferably provide for fine adjustment to facilitate opening and closing of the valve, particularly when the opening and closing is by differential pressures.

The inlet of the fluid passage is preferably bifurcated and present two spaced adjacent ports which are directed in the same direction. The passage and the ports are of tubular formation while the closure elements may be provided with tapering end regions adapted to seatingly engage their respective ports in sealing engagement.

The movable closure element is captively associated with the carrier and is movable to a limited extent in at least the same direction of movement of the said movable part. Said element is received with clearance in a locating recess in the carrier and from which recess an outwardly directed opening extends for escape of fluid trapped below the element.

The ports are advantageously of the same dimensions but may be of different sizes if required.

On requiring opening of the valve where a suction or negative force tends to sustain the closure elements in the closed position, such sustaining action is distributed to all the closure elements and consequently, when the movable part moves away from the carrier the seating of the fixed closure element only is firstly parted. Immediately on such parting the said sustaining force is destroyed thus permitting an easy and substantially instantaneous complete opening of the valve.

As aforesaid the movable part of the valve assembly may be manually displaced in an axial direction for opening and closing of the valve. Such manual displacement is by a mechanism including, for instance, a lever arrangement, screw means or other mechanical motion transmitting arrangements. When the valve is required to be opened and closed by float means, the valve is provided with a float-mounting lever which is connected to the movable part of the valve while a suitable purchase is presented to cause movement of the movable part.

When differential pressures are employed to automatically cause opening and closing of the valve, the means to neutralize fluid pressure acting on the movable part must be employed as also the said biassing means. With this arrangement the movable fluid passage part is provided adjacent the outlet end thereof, and at a position isolated from the inlet portion of the valve chamber, with face-forming means for reaction thereon of the fluid pressure at the outlet portion of the valve whereon a pressure can be produced for forced movement of the movable part in one direction and against the force of the biassing means. The said biassing force is preferably adjustable and is conveniently presented by a spring of which the effective force is variable. The face-forming means on which the fluid pressure at the valve outlet reacts comprises an pistonlike arrangement operating in an enlarged portion of the valve casing and is in the form of a piston sealingly and slidingly engaging the walls of said portion of the valve casing.

With the movable fluid passage part an auxiliary valve device may be associated and adapted to prevent reverse flow through the passage and the valve casing. Said auxiliary valve device, if provided, is advantageously associated with an outlet forming open end of the movable part. The auxiliary valve device may comprise a biassed valve member disposed across the outlet end of the fluid passage of the movable part and is displaceable by the pressure of the fluid passing normally through the valve.

For the invention to be clearly understood and carried into practice reference will now be made to the accompanying sheets of drawings.

BRIEF DESCRIPTION OF DRAWINGS

FIG. 1 is a longitudinal cross section of a manually operated valve constructed according to the invention;

FIG. 2 is a view similar to FIG. 1, showing a float operated valve according to the invention;

FIG. 3 is a sectional elevation of an automatic valve according to the Invention;

FIG. 4 is a section on line IV–IV of FIG. 3;

FIG. 5 is a fragmentary section on line V–V of figure 3 of the valve casing;

FIG. 6 is a transverse cross section on line VI–VI of an internal movable part of the valve;

FIG. 7 is a plan of a closure element carrier of any of the valves shown in FIGS. 1, 2, 3 and 4; and FIG. 8 is a section on line VIII–VIII of FIG. 7.

DESCRIPTION OF PREFERRED EMBODIMENTS

The valve shown in all the drawings comprise a tubular casing or body 10 having in one side a tubular inlet 12 which is connectable to a fluid supply pipe, not shown. The outlet 14 of the valve is provided substantially axially on a part adapted to be sealingly but removably secured across end 16 of the body 10 while a cap is similarly secured across the opposite end 16.1.

On opposite internal sides the body 10 is provided with relatively spaced and longitudinally arranged rigid ribs 18 across transverse ends of which a closure element carrier 20 is rigidly but removably fixed by screws 22.

Axially within the body 10 an axially movable fluid passage part 24 is guidingly located. Said part comprises a tubular portion 26 of which one open end extends beyond the end 16 of body 10 whereas the opposite end is bifurcated or divided to form two transversely spaced axial passages 28. On the wide portion of part 24 axial fins 30 are provided for sliding movement between the ribs 18 whereby rotation of the part 24 is prevented. At right angles to said fins 30 a transversely spaced pair of axially projecting arms 32 are provided on the part 24 and across the ends of which a bar 34 is removably fixed by screws 36. The bar 34 provides an outwardly directed axial extension 38 adapted to slidingly engage a cylinder 40 provided in closure part or cap 42 across end 16.1 of the body 10.

At the end 16 of body part 10 a radial flange 44 with weep or ventilation holes 46, is provided having a screw-threaded rim 48. At said end 16 of body 10 an inwardly directed flange 50 is also provided for a divider 52 for the valve chamber which is formed within the body 10 and a part 54. Part 54, which is provided with the outlet 14, is removably secured to end 16 of body 10. The divider 52 is a resilient material lipped seal ring clamped in position on the flange 50 by a rigid ring 55 which in turn is clamped between the body 10 and the part 54.

The exterior of the tubular portion 26 of part 24 is in sliding and sealing engagement with seal 52.

The closure elements 56 and 56.1, which are of squat cylindrical shape and having tapered closure-forming ends, are received in recesses 58, 58.1 respectively of the carrier 20. Element 56 is fixed to the carrier by a diametrical pin 60. Element 56.1 is axially movably mounted within the recess 58.1 to a limited extent and is captively located by a diametrical pin 60 of which the ends are received in perpendicular slots 62 of rigid lugs 64 provided on the sides of the carrier 20. In the recess 58.1 a hole 66 is provided which extends through the carrier 20 for expulsion of fluid trapped in the recess.

The axial extension 38 of bar 34 carries an annular lipped seal 70 which engages the cylinder 40 in pistonlike fashion.

In the valve shown in FIG. 1 the extension 38 projects beyond the outer end of cylinder 40 and is coupled to a knob 72 which in turn is screwed onto the end of the cylinder 40. Depending on the direction of rotation of the knob 72 the fluid passage part 24 is axially moved for opening and closing of the valve by withdrawing or advancing the double ported end of part 24 from or to the coacting closure elements 56, 56.1.

The valve shown in FIG. 2 mounts on the part 42 a lever 74 having on one end a float 76 whereas the opposite end is connected by a link 78 to said extension 38. A float actuated valve is thus provided.

The part 54 provides an outlet of spoutlike form.

The valve as shown in FIG. 1 may be used as a tap or the like whereas the valve shown in FIG. 2 can be used in the water supply of a lavatory cistern, animal water troughs and the like.

The differential fluid pressure controlled valve shown in FIGS. 4 and 5 provides a chamber of stepped formation and presents a larger bore cylinder part 80 at the outlet end than at the inlet end while the fixed chamber divider 52 is secured as aforesaid at the connection of the smaller and larger bore portions.

In the closure part 42.1 the cylinder 40 is extended to form a deep recess for axial location of a compression spring 82 which in turn is carried by its outwardly directed end on a support 84, support 84 is axially displacable by a screw 86 operative from the exterior of the valve and whereby the effective force of the spring 82 can be varied. The effective cross-sectional area of the said cylinder 40 must be equal to the cross section area of the material of the tubular part 26. The compression spring 82 is arranged to apply a biassing force on the fluid passage part 24 for axial displacement thereof away from the closure elements 56, 56.1. The closure element carrier 20 is disposed diametrically within the body and axially spaced from and at right angles to bar 34.

On the tubular portion 26 of the movable part 24 and near the open end a lipped seal ring 88 is fixed between clamping flanges 90, 90.1 which are screwed onto said portion 26. The seal 88 is in engagement with the walls of the cylinder part 80 in pistonlike fashion.

In the outlet 14 a mushroom-shaped auxiliary valve 92 is mounted for axial movement and for seating on the open end 26.1 of the tubular portion 26 when the movable part is in the open position. A spring 94 applies a seating bias on the valve 92. This provision of valve 92 is optional and is required where there is a possibility of a reversed flow of fluid through the valve when the movable part, due to insufficient valve closing pressure being developed on the piston forming seal 88, remains open.

In the arrangement of this form of the valve the spring 82 is adapted to cause movement of part 24 for the ports thereof to lift off the closure elements 56, 56.1 when the total fluid pressure on the pistonlike seal 88 is reduced to a predetermined level. Fluid can now flow through the chamber from the inlet 12, through the tubular part 26 and through the outlet 14. When the pressure at the outlet builds up equal to or in excess of the fluid supply pressure, the pressure reaction on the pistonlike seal causes the movable part 24 to move towards and onto the closure elements 56, 56.1 to close off the passage. Transverse faces of the movable valves assembly parts at the inlet portion of the valve are such that the pressure of the fluid supply is in equilibrium and do not influence movement. On reduction of fluid pressure at the outlet of the chamber, the action of the compression spring 82 causes axial displacement of the assembly of the movable parts.

The valve according to FIGS. 3 and 4 is particularly suitable for use in hot water systems.

I claim:

1. A valve including a casing having an inlet and an outlet, a movable part within the casing, a fluid passage in the movable part and of which an end thereof at the inlet of the valve is divided and presents at least two adjacent spaced ports which are directed in the direction of movement of the movable part, a closure element for each port, a stationary carrier within the valve for the closure elements and whereon one closure element is fixed and the remaining element is movably and captively attached while the movement of said element relative to the carrier is in the same direction and to a smaller extent than the movement of the movable fluid passage part, means attached to the movable fluid passage part for displacement to a valve open position and a valve closed position; the arrangement being such that for opening of the valve by displacing the movable part away from the carrier, the fixed closure element opens before the movable closure element whereby an initial force required for opening of the valve against a closing sustaining force is reduced.

2. A valve as claimed in claim 1 wherein the movable fluid passage part is of tubular form and having one end bifurcated to present the adjacent spaced ports, the casing of the valve having a divider isolating the inlet from the outlet whereas the movable fluid passage part is in sliding and sealing engagement with the divider.

3. A valve as claimed in claim 1 or 2 wherein the displacement of the movable fluid passage part is by a manually operated mechanism.

4. A valve as claimed in claim 1 or 2 wherein the displacement of the movable fluid passage part is by a float-operated mechanism.

5. A valve as claimed in claim 2 wherein the movable fluid passage part is provided with equal opposed faces on the portion within the inlet portion of the valve for reaction thereon of the fluid supply pressure and neutralizing displacing fluid pressures on said part.

6. A valve as claimed in claim 5 wherein variable biassing means is provided acting on the movable fluid passage part to facilitate opening of the valve.

7. A valve as claimed in claim 6 wherein there is provided a cylinder extending from the inlet side of the valve and wherein a pistonlike member provided on an extension of the movable fluid passage part is operative and on which extension the biassing means engages, a cylinder at the outlet side of the valve and wherein a pistonlike member on the movable fluid passage part is operative, said latter pistonlike part being subjected to fluid pressure at the outlet of the valve and by which pressure the movable fluid passage part is displaced to and held in the closed position on the closure elements and against the action of the biassing means, reduction of pressure on the pistonlike member at the outlet side resulting in displacement of the movable fluid passage part by the biassing means to cause opening of the valve.

8. A valve as claimed in claim 7 wherein the biassing means comprises a compression spring located in the cylinder at the inlet side of the valve and outwardly of the pistonlike member operative in said cylinder.

9. A valve as claimed in claim 8 wherein the spring is carried on a support which is adjustable by screw means operated exteriorly of the valve for variation of the valve opening force produced by the spring in relation to fluid pressure acting on the pistonlike member at the outlet of the valve.

10. A valve as claimed in claim 9 wherein a biassed valve is provided seatingly acting on the movable fluid passage at the outlet portion of the valve and adapted to prevent return flow of fluid through the valve.

UNITED STATES PATENT OFFICE
CERTIFICATE OF CORRECTION

Patent No. 3,590,856　　　　　　　　　Dated July 6, 1971

Inventor(s) Salmon Gerhardus Antonie FRITZ

It is certified that error appears in the above-identified patent and that said Letters Patent are hereby corrected as shown below:

In column 1, line 6, the name of the assignee should read as follows:

Pressure Neutralized Valves (Proprietary) Limited.

Signed and sealed this 21st day of March 1972.

(SEAL)
Attest:

EDWARD M. FLETCHER, JR.　　　　ROBERT GOTTSCHALK
Attesting Officer　　　　　　　　Commissioner of Patents